(12) United States Patent
Jeong et al.

(10) Patent No.: US 8,133,958 B2
(45) Date of Patent: Mar. 13, 2012

(54) METHACRYLATE RESIN WITH EXCELLENT DISCOLORATION-RESISTANCE AND TRANSPARENCY AND METHOD FOR PREPARING THE SAME

(75) Inventors: Jae Hoon Jeong, Yeosu-si (KR); Doo Han Ha, Yeosu-si (KR); Jung Ho Jang, Yeosu-si (KR)

(73) Assignee: Cheil Industries Inc., Gumi-si (KR)

( * ) Notice: Subject to any disclaimer, the term of this patent is extended or adjusted under 35 U.S.C. 154(b) by 384 days.

(21) Appl. No.: 11/960,861

(22) Filed: Dec. 20, 2007

(65) Prior Publication Data

US 2008/0154008 A1 Jun. 26, 2008

(30) Foreign Application Priority Data

Dec. 26, 2006 (KR) .......................... 10-2006-133967
Oct. 22, 2007 (KR) .......................... 10-2007-106076

(51) Int. Cl.
*C08G 85/00* (2006.01)
*C08F 120/06* (2006.01)
*C08F 118/02* (2006.01)
*C08F 20/10* (2006.01)

(52) U.S. Cl. ........ 526/72; 526/317.1; 526/319; 526/328

(58) Field of Classification Search .................... 526/72, 526/317.1, 319, 328
See application file for complete search history.

(56) References Cited

U.S. PATENT DOCUMENTS

| | | | |
|---|---|---|---|
| 3,978,022 A | 8/1976 | Carson, Jr. | |
| 4,845,175 A | 7/1989 | Lo | |
| 5,142,008 A | 8/1992 | Holle et al. | |
| 5,453,472 A * | 9/1995 | Deckers et al. ................. | 526/74 |
| 5,726,268 A | 3/1998 | Sakamoto | |
| 6,372,901 B1 | 4/2002 | Partain, III et al. | |
| 6,417,268 B1 | 7/2002 | Zhang et al. | |

FOREIGN PATENT DOCUMENTS

| | | |
|---|---|---|
| EP | 0469372 A1 | 2/1992 |
| EP | 0630908 A2 | 12/1994 |
| WO | 2008/078918 A1 | 7/2008 |

OTHER PUBLICATIONS

International Search Report in counterpart International Application No. PCT/KR2007/006730, dated Mar. 19, 2008.
Lee, D.-Y., et al. "Preparation of small-sized carboxylated latexes by emulsion polymerization using alkali-soluble random copolymer", Journal of Applied Polymer Science, 69(3), pp. 543-550, Dec. 7, 1998.
Tam, K.C., et al. "Rheological properties of hydrophobically modified alkali-soluble polymers—effects of ethylene-oxide chain length", Journal of Polymer Science Part B: Polymer Physics, 36(13), pp. 2275-2290, Dec. 7, 1998.
International Written Opinion in counterpart International Application No. PCT/KR2007/006730 dated Mar. 19, 2008.
International Preliminary Report on Patentability in counterpart International Application No. PCT/KR2007/006730 dated Jun. 30, 2009.
Extended European Search Report in counterpart European Application No. 07851696 dated May 11, 2010.

* cited by examiner

*Primary Examiner* — Michael M Bernshteyn
(74) *Attorney, Agent, or Firm* — Summa, Additon & Ashe, P.A.

(57) ABSTRACT

One aspect of the invention relates to a methacrylate resin prepared by suspension polymerization using a polyalkylacrylate-acrylic acid as a suspension stabilizer. The suspension stabilizer is used in an amount of about 0.05 to about 0.25 parts by weight per 100 parts by weight of a monomer mixture. Another aspect of the invention relates to a method for preparing a methacrylate resin, which comprises: preparing a mixture by mixing an initiator and a chain-transfer agent with a monomer mixture comprising at least about 50% by weight of alkyl methacrylate; and adding the mixture to an aqueous solution of polyalkylacrylate-acrylic acid to conduct suspension polymerization.

14 Claims, No Drawings

METHACRYLATE RESIN WITH EXCELLENT DISCOLORATION-RESISTANCE AND TRANSPARENCY AND METHOD FOR PREPARING THE SAME

CROSS-REFERENCE TO RELATED APPLICATIONS

This non-provisional application claims priority under 35 USC Section 119 from Korean Patent Application No. 2006-133967, filed on Dec. 26, 2006, and Korean Patent Application No. 2007-106076, filed on Oct. 22, 2007, the entire disclosure of each of which is hereby incorporated by reference.

FIELD OF THE INVENTION

The present invention relates to a methacrylate resin with discoloration-resistance and transparency.

BACKGROUND OF THE INVENTION

Generally, methacrylate resins have sufficient rigidity, high transparency, and excellent weatherability. Therefore, methacrylate resins can be injection molded or extruded to form products for a variety of applications, for example, injection molded objects, such as lamp lenses and meter covers of automobiles, eyeglass lenses, and the like, or extruded sheets, such as sign-boards and name-plates.

When methacrylic resins are molded into extrusion products, it is desired that the resins have high flow during the molding process and transparency. In order to improve the processing property of methacrylic resins, methods of decreasing the molecular weight of resin or methods of introducing an acrylic comonomer during polymerization have been proposed. While decreasing the molecular weight of a resin may improve the flowability thereof, this can also degrade the mechanical properties of the resin.

U.S. Pat. No. 5,726,268 discloses a methyl methacrylate polymer having a molecular weight of 80,000 to 400,000 prepared by introducing a polyfunctional monomer to improve the properties of the resin. However, since methacrylate resins typically have a high melt viscosity, a resin having such a high molecular weight may require harsh conditions during molding processes, which can decrease the discoloration-resistance and heat stability of the resin.

In general, a methacrylate resin has low heat stability due to its polymerization properties. That is, the polymerization reaction of a methacrylate resin tends to undergo a disproportionation termination reaction which can form terminal unsaturated groups in the polymer terminal. As a result, pyrolysis occurs during molding process, which results in low heat resistance and discoloration-resistance.

U.S. Pat. No. 3,978,022 discloses a composition comprising a methyl methacrylate-containing polymer employing a disulfide to inhibit pyrolysis.

SUMMARY OF THE INVENTION

The present invention includes a methacrylic resin having excellent discoloration-resistance, transparency and flowability while maintaining good mechanical properties. The methacrylate resin can be prepared by suspension polymerization, during which a polyalkylacrylate-acrylic acid is introduced as a suspension stabilizer.

In exemplary embodiments of the invention, the suspension stabilizer is used in an amount of about 0.05 to about 0.25 parts by weight per 100 parts by weight of a monomer mixture.

The monomer mixture may comprise about 50 to about 100% by weight of an alkyl methacrylate and about 0 to about 50% by weight of a monomer copolymerizable with the alkyl methacrylate.

In exemplary embodiments of the invention, the alkyl methacrylate may include methyl methacrylate, ethyl methacrylate, propyl methacrylate or butyl methacrylate.

The polyalkylacrylate-acrylic acid may be at least one selected from polyethylacrylate-acrylic acid, polyethylacrylate-methyl acrylic acid and polyethylhexyl acrylate-acrylic acid.

The methacrylate resin can have a weight average molecular weight of about 15,000 to about 200,000.

In exemplary embodiments of the invention, the methacrylate resin has a Yellow Index according to ASTM D-1925 of about 0.9 or less, a total light transmittance at a sample thickness of 3.0 mm of about 92% or more and a haze of about 0.6 or less.

Another aspect of the invention provides a method for preparing a methacrylate resin. The method comprises preparing a mixture by mixing an initiator and a chain-transfer agent with a monomer mixture comprising at least about 50% by weight of alkyl methacrylate; and adding the mixture to an aqueous solution of polyalkylacrylate-acrylic acid to conduct suspension polymerization.

In exemplary embodiments of the invention, the aqueous solution of polyalkylacrylate-acrylic acid may further comprise a suspension stabilization aid.

In exemplary embodiments of the invention, the polymerization may be conducted at about 70 to about 120° C. for about 2 to about 8 hours.

The polymerization may be conducted in the presence of additives selected from the group consisting of lubricants, ultraviolet absorbents, dyes, antioxidants, and combinations thereof.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

One aspect of the invention relates to a methacrylate resin prepared by suspension polymerization wherein a polyalkylacrylate-acrylic acid is used as a suspension stabilizer.

In the present invention, the alkyl methacrylate is used in an amount of about 50 parts by weight or more based on the total monomers. If the amount of the alkyl methacrylate is less than about 50 parts by weight, the methacrylate resin obtained therefrom may have poor transparency and low mechanical strength.

In one embodiment, the monomer mixture may comprise about 50 to about 100% by weight of the alkyl methacrylate, and about 0 to about 50% by weight of a monomer copolymerizable with the alkyl methacrylate.

In another embodiment, the monomer mixture may comprise about 60 to about 99% by weight of the alkyl methacrylate and about 1 to about 40% by weight of a monomer copolymerizable with the alkyl methacrylate.

Examples of alkyl methacrylates suitable for use in the present invention may include without limitation methacrylic acid esters such as methyl methacrylate, ethyl methacrylate, propyl methacrylate, butyl methacrylate, and the like, and combinations thereof.

The monomer copolymerizable with the alkyl methacrylate may be, but is not limited to, a mono-functional unsaturated monomer. Examples of mono-functional unsaturated monomers suitable for use in the invention may include without limitation methacrylic acid ester monomers including ethyl methacrylate, propyl methacrylate, butyl methacrylate and benzyl methacrylate; acrylic acid ester monomers including methyl acrylate, ethyl acrylate, propyl acrylate, butyl acrylate, and 2-ethyl hexyl acrylate; unsaturated carboxylic acid monomers including acrylic acid and methacrylic acid; acid anhydride monomers including maleic anhydride; hydroxyl group containing ester monomers including 2-hydroxyethyl acrylate, 2-hydroxypropyl acrylate, and monoglycerol acrylate; amide monomers including acryl amide and methacryl amide; nitrile monomers including acrylonitrile and methacrylonitrile; allyl glycidyl ethers; glycidyl methacrylates; styrenic monomers including styrene and α-methyl styrene; and the like. These monomers can be used alone or in combination with one another.

In the present invention, the polyalkylacrylate-acrylic acid is used as a suspension stabilizer.

Examples of polyalkylacrylate-acrylic acids suitable for use in the invention may include without limitation polyethylacrylate-acrylic acid, polyethylacrylate-methyl acrylic acid, polyethylhexylacrylate-acrylic acid, and the like, and combinations thereof.

Organic suspension stabilizers such as polyolefin-maleic acid, polyvinyl alcohol, and cellulose, and inorganic suspension stabilizers such as tricalcium phosphate have been typically used as suspension stabilizers. However, the use of conventional suspension stabilizers may decrease discoloration-resistance and transparency.

In exemplary embodiments of the invention, the polyalkylacrylate-acrylic acid may be used in an amount of about 0.05 to about 0.25 parts by weight, for example about 0.07 to about 0.18 parts by weight, per 100 parts by weight of the monomer mixture. If the amount of the polyalkylacrylate-acrylic acid is more than about 0.25 parts by weight, a great amount of foam may be generated during polymerization so that workability of the resin obtained therefrom may be degraded. On the other hand, if the amount of the polyalkylacrylate-acrylic acid is less than about 0.05 parts by weight, dispersion stability can decrease.

The methacrylate resin of the invention may be prepared by a conventional suspension polymerization, and conventional suspension stabilization aids, chain transfer agents, anti-oxidants, and polymerization initiators may be used together.

Another aspect of the invention provides a novel method for preparing a methacrylate resin. In exemplary embodiments, the method comprises preparing a mixture by mixing an initiator and a chain-transfer agent with a monomer mixture comprising at least about 50% by weight of alkyl methacrylate; and adding the mixture to an aqueous solution of polyalkylacrylate-acrylic acid under conditions sufficient to conduct suspension polymerization.

Examples of chain-transfer agents suitable for use in the invention may comprise without limitation alkyl mercaptans represented by the formula of $CH_3(CH_2)_nSH$, such as n-butyl mercaptan, n-octyl mercaptan, n-dodecyl mercaptan, tertiary dodecyl mercaptan, isopropyl mercaptan, n-amyl mercaptan and the like; halogen compounds such as carbon tetrachloride and the like; and aromatic compounds such as α-methyl styrene dimer and α-ethyl styrene dimer. The amount of the chain-transfer agent can vary depending on its type. The amount of the chain-transfer agent can range from about 0.02 to about 10 parts by weight, per 100 parts by weight of the monomer mixture. If the amount of the chain-transfer agent is less than about 0.02 parts by weight, thermal decomposition may occur so that the heat resistance may deteriorate. If the amount of the chain transfer agent is more than about 10 parts by weight, the resin obtained therefrom may have low molecular weight so that the mechanical properties may decrease.

Examples of polymerization initiators suitable for use in the invention may include without limitation octanoyl peroxide, decanoyl peroxide, lauroyl peroxide, benzoyl peroxide, monochlorobenzoyl peroxide, dichloro benzoyl peroxide, p-methyl benzoyl peroxide, tert-butyl perbenzoate, azobisisobutyronitrile, azobis-(2,4-dimethyl)-valeronitrile and the like, and combinations thereof.

The aqueous solution of polyalkylacrylate-acrylic acid may further comprise a suspension stabilization aid.

Examples of suspension stabilization aids suitable for use in the invention may include without limitation disodium hydrogen phosphate or sodium dihydrogen phosphate. Sodium sulfate may be employed to control solubility of an aqueous polymer or monomer.

The polymerization can be conducted in the presence of additives such as those selected from the group consisting of lubricants, ultraviolet absorbents, dyes, anti-oxidants, and combinations thereof. These additives may be added during polymerization or the pelletization process.

Examples of antioxidants suitable for use in the invention may include without limitation octadecyl 3-(3,5-di-tertiary butyl-4 hydroxyphenyl)propionate, triethylene glycol-bis-3 (3-tertiary butyl-4-hydroxy-5-methylphenyl)propionate, 2,6-di-tertiary butyl-4-methyl phenol, 2,2'-methylenebis(4-methyl-6-tertiary-butyl phenol), tris(2,4-di-tertiary-butylphenyl)phosphite, n-octadecyl-3 (3,5-di-tertiarybutyl-4-hydroxyphenyl)propionate, 1,3,5-tri(3,5-di-tertiary-butyl-4-hydroxybenzyl)isocyanate, 3-3,5-di-tertiary-butyl-4-hydroxyphenyl)propionate, distearylthiodipropionate, laurylthiopropionate methane, and diphenyl-isooctyl phosphite, and the like, and combinations thereof.

The polymerization can be conducted at about 70 to about 120° C. for about 2 to about 8 hours.

After completing the polymerization reaction, the polymer is cooled, washed, dehydrated and dried to obtain the polymer in particle form. The polymer is then pelletized in an extrusion process to obtain a resin composition. The methacrylate resin obtained therefrom may have a weight average molecular weight of about 15,000 to about 200,000, for example about 50,000 to about 150,000, and as another example about 50,000 to about 100,000.

The methacrylate resin can have a Yellow Index according to ASTM D-1925 of about 0.9 or less, a total light transmittance at a sample thickness of 3.0 mm of about 92% or more and a haze of about 0.6 or less.

In one embodiment of the present invention, the methacrylate resin can have a Yellow Index according to ASTM D-1925 of about 0.1 to about 0.85, a total light transmittance at a sample thickness of 3.0 mm of about 93 to about 99% and a haze of about 0.1 to about 0.55.

The invention may be better understood by reference to the following examples which are intended for the purpose of illustration and are not to be construed as in any way limiting the scope of the present invention, which is defined in the claims appended hereto.

EXAMPLES

Example 1

A monomer mixture comprising 97 parts by weight of methylmethacrylate and 3 parts by weight of methyl acrylate, 0.3 parts by weight of lauroyl peroxide and 0.31 parts by weight of normal-octyl mercaptan are mixed to form a homogeneous mixture.

Trace amounts of suspension stabilization aid, disodium hydrogen phosphate and sodium sulfate are dissolved in 110 parts by weight of ion exchanged water in a stainless steel high-pressure reactor having a stirring equipment, and 0.15 parts by weight of polyethylacrylate-methylacrylic acid (molecular weight is at least 1,000,000) as a suspension stabilizer is added thereto and stirred. To the aqueous solution of polyalkylacrylate-acrylic acid is added the monomer mixture and stirred intensively while purging the reactor with an inert gas such as nitrogen, argon, and the like and heating the reactor. The reaction is conducted at 72° C. for 2 hours, then 110° C. for one hour to complete the polymerization reaction. The resultant product is washed, dehydrated and dried to obtain the polymer in particle form and the molecular weight is measured. The polymer particles are extruded and injected into a test specimen. The physical properties of the test specimen are measured. The results are shown in table 1.

Example 2

Example 2 is prepared in the same manner as in Example 1 except that 0.1 part by weight of polyethylacrylate-methylacrylic acid is used.

Example 3

Example 3 is prepared in the same manner as in Example 1 except that 0.15 parts by weight of polyethylhexylacrylate-acrylic acid is used.

Example 4

Example 4 is prepared in the same manner as in Example 1 except that 0.1 parts by weight of polyethylhexylacrylate-acrylic acid is used.

Comparative Example 1

Comparative Example 1 is prepared in the same manner as in Example 1 except that 0.3 parts by weight of polyvinyl alcohol is used instead of polyethylacrylate-methylacrylic acid.

Comparative Example 2

Comparative Example 2 is prepared in the same manner as in Example 1 except that 0.5 parts by weight of polyolefin-maleic acid is used instead of polyethylacrylate-methylacrylic acid.

Comparative Example 3

Comparative Example 3 is prepared in the same manner as in Example 1 except that 0.5 parts by weight of polyether modified polydimethyl siloxane is used instead of polyethylacrylate-methylacrylic acid.

Comparative Example 4

Comparative Example 4 is prepared in the same manner as in Example 1 except that 0.6 parts by weight of tricalcium phosphate is used instead of polyethylacrylate-methylacrylic acid.

The results of the physical properties are shown in Table 1.

TABLE 1

| | | | Examples | | | | Comparative Examples | | | |
|---|---|---|---|---|---|---|---|---|---|---|
| | | | 1 | 2 | 3 | 4 | 1 | 2 | 3 | 4 |
| Suspension stabilizer | S-1 | | 0.15 | 0.1 | — | — | — | — | — | — |
| | S-2 | | — | — | 0.15 | 0.1 | — | — | — | — |
| | S-3 | | — | — | — | — | 0.3 | — | — | — |
| | S-4 | | — | — | — | — | — | 0.5 | — | — |
| | S-5 | | — | — | — | — | — | — | 0.5 | — |
| | S-6 | | — | — | — | — | — | — | — | 0.6 |
| Property of material | Molecular weight | Mw | 85K | 83K | 89K | 87K | 90K | 85K | 83K | 84K |
| | | Mn | 43K | 41K | 44K | 42K | 41K | 42K | 41K | 42K |
| | MI | | 5.7 | 5.8 | 4.9 | 5.2 | 3.4 | 4.2 | 3.9 | 4.1 |
| | Yellow Index (YI) | | 0.72 | 0.76 | 0.80 | 0.82 | 2.5 | 2.9 | 1.8 | 10.4 |
| | Transmittance | | 93.1 | 93.2 | 93.1 | 93.0 | 91.0 | 90.1 | 89 | 72.2 |
| | HAZE | | 0.4 | 0.5 | 0.4 | 0.5 | 2.1 | 1.6 | 1.5 | 91.0 |

S-1: Polyethylacrylate-methylacrylic acid;
S-2: Polyethylhexylacrylate-acrylic acid;
S-3: Polyvinylalcohol;
S-4: Polyolefin-maleic acid;
S-5: Polyether modified polydimethylsiloxane;
S-6: Tricalcium phospate.

The physical properties are measured as follow:

(1) Molecular weight: The molecular weight is measured by using a gel permeation chromatography (GPC).

(2) MI (Melt flow Index): The melt flow index is measured in accordance with ASTM D-1238 under a load of 10 kg at 220° C. for 10 minutes.

(3) YI (Yellow Index): The yellow index is measured in accordance with ASTM D-1925 by means of a spectrum calorimeter.

(4) Transparency: The transparency is evaluated as total light transmittance and haze by means of a color computer manufactured by SUGA INSTRUMENT Co., Ltd. of Japan using a 3 mm thick test sample:

Total Light Transmittance(%)=(light transmitted at all forward angles/incident light)×100

HAZE(%)=(diffused light transmittance/total light transmittance)×100.

As shown in Table 1, Examples 1 to 4 using polyalkylacrylate-acrylic acid as a suspension stabilizer show excellent discoloration-resistance and transparency as compared with Comparative Examples.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A methacrylate resin prepared by suspension polymerization wherein a polyalkylacrylate-acrylic acid selected from the group consisting of is used as a suspension stabilizer, wherein said suspension stabilizer is used in an amount of about 0.05 to about 0.25 parts by weight per 100 parts by weight of a monomer mixture used to prepare of the said methacrylate resin.

2. The methacrylate resin of claim 1, wherein said monomer mixture comprises about 50 to about 100% by weight of an alkyl methacrylate, and about 0 to about 50% by weight of a monomer copolymerizable with the alkyl methacrylate.

3. The methacrylate resin of claim 2, wherein the monomer copolymerizable with the alkyl methacrylate comprises a monomer selected from the group consisting of methacrylic acid ester monomers; acrylic acid ester monomers; unsaturated carboxylic acid monomers; acid anhydride monomers; hydroxyl group containing ester monomers; amide monomers; nitrile monomers; allyl glycidyl ethers; glycidyl methacrylates; styrenic monomers; and combinations thereof.

4. The methacrylate resin of claim 3, wherein said methacrylic acid ester monomer comprises a monomer selected from the group consisting of ethyl methacrylate, propyl methacrylate, butyl methacrylate, and benzyl methacrylate; said acrylic acid ester monomer comprises a monomer selected from the group consisting of methyl acrylate, ethyl acrylate, propyl acrylate, butyl acrylate, and 2-ethyl hexyl acrylate; said unsaturated carboxylic acid monomer comprises a monomer selected from the group consisting of acrylic acid and methacrylic acid; said acid anhydride monomer comprises maleic anhydride; said hydroxyl group containing ester monomer comprises a monomer selected from the group consisting of 2-hydroxyethyl acrylate, 2-hydroxypropyl acrylate, and monoglycerol acrylate; said amide monomer comprises a monomer selected from the group consisting of acryl amide and methacryl amide; said nitrile monomer comprises a monomer selected from the group consisting of acrylonitrile and methacrylonitrile; and said styrenic monomer comprises a monomer selected from the group consisting of styrene and α-methyl styrene.

5. The methacrylate resin of claim 2, wherein said alkyl methacrylate is methyl methacrylate, ethyl methacrylate, propyl methacrylate, or butyl methacrylate.

6. The methacrylate resin of claim 1, wherein said methacrylate resin has a weight average molecular weight of from about 15,000 to about 200,000.

7. The methacrylate resin of claim 1, wherein said methacrylate resin has a Yellow Index according to ASTM D-1925 of about 0.9 or less, a total light transmittance at a sample thickness of 3.0 mm of about 92% or more and a haze of about 0.6 or less.

8. A method for preparing a methacrylate resin of claim 1, comprising:
   preparing a mixture by mixing an initiator and a chain-transfer agent with a monomer mixture comprising at least about 50% by weight of alkyl methacrylate; and
   adding the mixture to an aqueous solution of polyalkylacrylate-acrylic acid selected from the group consisting of polyethylacrylate-acrylic acid and polyethyl-hexylacrylate-acrylic acid under conditions to conduct suspension polymerization.

9. The method of claim 8, wherein said aqueous solution of polyalkylacrylate-acrylic acid further comprises a suspension stabilization aid.

10. The method of claim 8, wherein said polymerization is conducted at about 70 to about 120° C. for about 2 to about 8 hours.

11. The method of claim 8, wherein said polymerization is conducted in the presence of additives selected from the group consisting of lubricants, ultraviolet absorbents, dyes, antioxidants, and combinations thereof.

12. The methacrylate resin of claim 1, wherein said methacrylate resin has a Yellow Index according to ASTM D-1925 of about 0.1 to about 0.85, a total light transmittance at a sample thickness of 3.0 mm of about 93 to about 99% and a haze of about 0.1 to about 0.55.

13. The method of claim 8, wherein said suspension polymerization is initiated after the mixture of initiator, chain-transfer agent and monomer mixture is added to the aqueous solution of polyalkylacrylate-acrylic acid.

14. The method of claim 8, wherein said suspension stabilizer is used in an amount of about 0.05 to about 0.25 parts by weight per 100 parts by weight of said monomer mixture.

* * * * *

UNITED STATES PATENT AND TRADEMARK OFFICE
CERTIFICATE OF CORRECTION

PATENT NO. : 8,133,958 B2
APPLICATION NO. : 11/960861
DATED : March 13, 2012
INVENTOR(S) : Jeong et al.

Page 1 of 2

It is certified that error appears in the above-identified patent and that said Letters Patent is hereby corrected as shown below:

<u>In the Specification:</u>

Column 6, Line 6 of the legend under Table I reads "S-6: Tricalcium phospate" and should read "S-6: Tricalcium <u>phosphate</u>"

Column 6, Line 55, reads "calorimeter." and should read "colorimeter."

<u>In the Claims:</u>

Claim 1 reads: "A methacrylate resin prepared by suspension polymerization wherein a polyalkylacrylate-acrylic acid selected from the group consisting of is used as a suspension stabilizer, wherein said suspension stabilizer is used in an amount of about 0.05 to about 0.25 parts by weight per 100 parts by weight of a monomer mixture used to prepare of the said methacrylate resin."

and should read: "A methacrylate resin prepared by suspension polymerization wherein a polyalkylacrylate-acrylic acid selected from the group consisting of <u>poly(ethylacrylate-acrylic acid) and poly(ethylhexylacrylate-acrylic acid)</u> is used as a suspension stabilizer, wherein said suspension stabilizer is used in an amount of about 0.05 to about 0.25 parts by weight per 100 parts by weight of a monomer mixture used to prepare of the said methacrylate resin."

Claim 8 reads: A method for preparing a methacrylate resin of claim 1, comprising: preparing a mixture by mixing an initiator and a chain-transfer agent with a monomer mixture comprising at least about 50 % by weight of alkyl methacrylate; and adding the mixture to an aqueous solution of polyalkylacrylate-acrylic acid selected from the group consisting of polyethylacrylate-acrylic acid and polyethyl-hexylacrylate-acrylic acid under conditions to conduct suspension polymerization.

Signed and Sealed this
Twenty-ninth Day of May, 2012

David J. Kappos
*Director of the United States Patent and Trademark Office*

CERTIFICATE OF CORRECTION (continued)
U.S. Pat. No. 8,133,958 B2

In the Claims:

and should read: A method for preparing a methacrylate resin of claim 1, comprising: preparing a mixture by mixing an initiator and a chain-transfer agent with a monomer mixture comprising at least about 50 % by weight of alkyl methacrylate; and adding the mixture to an aqueous solution of polyalkylacrylate-acrylic acid selected from the group consisting of polyethylacrylate-acrylic acid and polyethyl-hexylacrylate-acrylic acid <u>in an amount of about 0.05 to about 0.25 parts by weight per 100 parts by weight of said monomer mixture</u> under conditions to conduct suspension polymerization.

UNITED STATES PATENT AND TRADEMARK OFFICE
CERTIFICATE OF CORRECTION

PATENT NO. : 8,133,958 B2
APPLICATION NO. : 11/960861
DATED : March 13, 2012
INVENTOR(S) : Jeong et al.

It is certified that error appears in the above-identified patent and that said Letters Patent is hereby corrected as shown below:

In the Specification:

Column 6, Line 6 of the legend under Table I reads "S-6: Tricalcium phospate" and should read "S-6: Tricalcium phosphate"

Column 6, Line 55, reads "calorimeter." and should read "colorimeter."

In the Claims:

Column 7, Lines 13-19, Claim 1 reads: "A methacrylate resin prepared by suspension polymerization wherein a polyalkylacrylate-acrylic acid selected from the group consisting of is used as a suspension stabilizer, wherein said suspension stabilizer is used in an amount of about 0.05 to about 0.25 parts by weight per 100 parts by weight of a monomer mixture used to prepare of the said methacrylate resin."

and should read: "A methacrylate resin prepared by suspension polymerization wherein a polyalkylacrylate-acrylic acid selected from the group consisting of poly(ethylacrylate-acrylic acid) and poly(ethylhexylacrylate-acrylic acid) is used as a suspension stabilizer, wherein said suspension stabilizer is used in an amount of about 0.05 to about 0.25 parts by weight per 100 parts by weight of a monomer mixture used to prepare of the said methacrylate resin."

Column 8, Lines 15-24, Claim 8 reads: A method for preparing a methacrylate resin of claim 1, comprising: preparing a mixture by mixing an initiator and a chain-transfer agent with a monomer This certificate supersedes the Certificate of Correction issued May 29, 2012.

Signed and Sealed this
Nineteenth Day of June, 2012

David J. Kappos
*Director of the United States Patent and Trademark Office*

CERTIFICATE OF CORRECTION (continued)
U.S. Pat. No. 8,133,958 B2

In the Claims:

mixture comprising at least about 50 % by weight of alkyl methacrylate; and adding the mixture to an aqueous solution of polyalkylacrylate-acrylic acid selected from the group consisting of polyethylacrylate-acrylic acid and polyethyl-hexylacrylate-acrylic acid under conditions to conduct suspension polymerization.

and should read: A method for preparing a methacrylate resin of claim 1, comprising: preparing a mixture by mixing an initiator and a chain-transfer agent with a monomer mixture comprising at least about 50 % by weight of alkyl methacrylate; and adding the mixture to an aqueous solution of polyalkylacrylate-acrylic acid selected from the group consisting of polyethylacrylate-acrylic acid and polyethyl-hexylacrylate-acrylic acid <u>in an amount of about 0.05 to about 0.25 parts by weight per 100 parts by weight of said monomer mixture</u> under conditions to conduct suspension polymerization.